(12) United States Patent
Stefanov et al.

(10) Patent No.: US 11,966,723 B2
(45) Date of Patent: Apr. 23, 2024

(54) AUTOMATIC MANAGEMENT OF APPLICATIONS IN A CONTAINERIZED ENVIRONMENT

(71) Applicant: SAP SE, Walldorf (DE)

(72) Inventors: Simeon Rumenov Stefanov, Sofia (BG); Nikolay Veselinov Valchev, Sofia (BG); Denis Simeonov Mihaylov, Sofia (BG)

(73) Assignee: SAP SE, Walldorf (DE)

( * ) Notice: Subject to any disclaimer, the term of this patent is extended or adjusted under 35 U.S.C. 154(b) by 173 days.

(21) Appl. No.: 17/457,788

(22) Filed: Dec. 6, 2021

(65) Prior Publication Data

US 2023/0176839 A1 Jun. 8, 2023

(51) Int. Cl.
| | |
|---|---|
| *G06F 9/44* | (2018.01) |
| *G06F 8/41* | (2018.01) |
| *G06F 8/61* | (2018.01) |
| *G06F 8/65* | (2018.01) |
| *G06F 9/445* | (2018.01) |
| *G06F 9/455* | (2018.01) |

(52) U.S. Cl.
CPC .................. *G06F 8/41* (2013.01); *G06F 8/61* (2013.01); *G06F 8/65* (2013.01)

(58) Field of Classification Search
CPC .................. G06F 8/41; G06F 8/61; G06F 8/65
See application file for complete search history.

(56) References Cited

U.S. PATENT DOCUMENTS

| | | | | |
|---|---|---|---|---|
| 9,612,815 | B1* | 4/2017 | Jagtap | ........................ G06F 8/61 |
| 11,321,188 | B2* | 5/2022 | Mitkar | ................... G06F 3/0605 |
| 11,347,806 | B2* | 5/2022 | Tal | .......... G06F 16/178 |
| 2017/0034023 | A1* | 2/2017 | Nickolov | ............ H04L 43/0817 |
| 2021/0373965 | A1* | 12/2021 | Hadas | .................. G06F 9/45558 |

(Continued)

FOREIGN PATENT DOCUMENTS

| | | | | |
|---|---|---|---|---|
| CN | 112269640 | A * | 1/2021 | .......... G06F 9/45558 |
| CN | 108369622 | B * | 11/2021 | ............. G06F 21/44 |

OTHER PUBLICATIONS

Shivani Gokhale, Creating Helm Charts to ease deployment of Enterprise Application and its related Services in Kubernetes, Sep. 2021, pp. 1-5. https://ieeexplore.ieee.org/stamp/stamp.jsp?tp=&arnumber=9776450 (Year: 2021).*

(Continued)

*Primary Examiner* — Mongbao Nguyen
(74) *Attorney, Agent, or Firm* — Fish & Richardson P.C.

(57) ABSTRACT

Computer-implemented methods, software, and systems for managing containerized applications are described. An event associated with a containerized application are described is detected. A collection of files associated with resources for the containerized application and descriptor information for executing a lifecycle operation for the containerized application is received in response to the detected event. An execution of the lifecycle operation associated with the detected event is invoked at a node cluster of a container runtime environment, wherein the execution of the lifecycle operation is based on the collection of files, the descriptor information, and a solution image associated with the containerized application, wherein the solution image is determined based on the descriptor information.

15 Claims, 4 Drawing Sheets

(56) References Cited

U.S. PATENT DOCUMENTS

| | | | |
|---|---|---|---|
| 2022/0035650 A1* | 2/2022 | Banerjee | H04L 12/4641 |
| 2022/0091583 A1* | 3/2022 | Biernat | G06F 9/45558 |
| 2022/0374282 A1* | 11/2022 | Caine | G06F 9/485 |
| 2023/0029801 A1* | 2/2023 | Sahu | G06F 8/47 |
| 2023/0082186 A1* | 3/2023 | Balcha | G06F 11/1451 714/4.11 |

OTHER PUBLICATIONS

Amit Warke, Storage Service Orchestration with Container Elasticity, 2018, pp. 1-10. https://ieeexplore.ieee.org/stamp/stamp.jsp?tp=&arnumber=8537844 (Year: 2018).*

Github.com [online], "Ben-manes/caffeine" May 2015, [retrieved on Nov. 24, 2021], retrieved from : URL <https://github.com/ben-manes/caffeine>, 4 pages.

Jwt.io [online], "JWT" Apr. 2014, [retrieved on Nov. 24, 2021], retrieved from : URL <https://jwt.io/>, 4 pages.

Sap.com [online], "PostgreSQL" Oct. 11, 2018, [retrieved on Nov. 24, 2021], retrieved from : URL <https://help.sap.com/viewer/6be7ed96ddeb4e158c2107c434142545/LATEST/en-US/1cb29d5c1f714e71a79379c6b7482428.html>, 2 pages.

Sap.com [online], "Protecting Your Application" Sep. 2021, [retrieved on Nov. 24, 2021], retrieved from : URL <https://help.sap.com/viewer/65de2977205c403bbc107264b8eccf4b/LATEST/en-US/7c5c565f37c946faa154909004331d57.html>, 3 pages.

Sap.com [online], "What Is Sap Btp Connectivity?" Sep. 2021, [retrieved on Nov. 24, 2021], retrieved from : URL <https://help.sap.com/viewer/cca91383641e40ffbe03bdc78f00f681/LATEST/en-US/daca64dacc6148fcb5c70ed86082ef91.html>, 6 pages.

Spring.io [online], "Cache Abstraction" Oct. 2014, [retrieved on Nov. 24, 2021], retrieved from : URL <https://docs.spring.io/spring-framework/docs/3.1.x/spring-framework-reference/html/cache.html>, 6 pages.

Spring.io [online], "Caching" Jun. 2015, [retrieved from Nov. 24, 2021], retrieved from : URL <https://docs.spring.io/spring-boot/docs/2.1.6.RELEASE/reference/html/boot-features-caching.html#boot-features-caching-provider-caffeine>, 9 pages.

\* cited by examiner

AUTOMATIC MANAGEMENT OF APPLICATIONS IN A CONTAINERIZED ENVIRONMENT

TECHNICAL FIELD

The present disclosure relates to computer-implemented methods, software, and systems for management of software applications in a container environment.

BACKGROUND

Software complexity is increasing and causes changes to lifecycle management and maintenance of software applications and platform systems. Software applications and systems can provide services and access to resources in cloud environments.

Different platforms can be used as part of a software development lifecycle management process. These platforms may provide different tools for deploying, starting, updating, or deleting applications. Different runtime infrastructures can be used for executing the applications. The complexity of managing the software development lifecycle process may be associated with executing lifecycle management tasks related to executing operations to deploy a software application on different runtime environments. Further, modifications to a running application in a particular environment may be integrated as part of the software lifecycle management process.

SUMMARY

Implementations of the present disclosure are generally directed to managing containerized applications.

One example method may include operations such as: detecting an event associated with a containerized application; in response to detecting the event, receiving a collection of files associated with resources for the containerized application and descriptor information for executing a lifecycle operation for the containerized application; and invoking execution of the lifecycle operation associated with the detected event at a node cluster of a container runtime environment, wherein the execution of the lifecycle operation is based on the collection of files, the descriptor information, and a solution image associated with the containerized application, wherein the solution image is determined based on the descriptor information.

In some instances, the example method can comprise providing a status notification for the execution of the lifecycle operation.

In some instances, the detected event is associated with a lifecycle operation. The event can be selected from a group comprising an installation event, an update event, and a delete event.

In some instances, the example method can further comprise: registering a solution operator to receive notification from a containerized orchestration server running at the node cluster of the container runtime environment. The solution operator can be configured to listen to events registered at the containerized orchestration server to detect the event associated with the containerized application.

In some instances, the detection of the event can be performed by a solution operator running at the node cluster of the containerized runtime environment.

In some instances, the example method can further comprise receiving, at lifecycle management orchestrator at a cloud platform, a request to manage the containerized application. The receiving of the request can comprises: receiving, at a lifecycle manager repository associated with the cloud platform, the collection of files and the descriptor information; and receiving, at a central repository associated with the cloud platform, a solution image as an executable file for running the containerized application in a container at the cluster node at the container runtime environment.

In some instances, the example method can further comprise: receiving, at a lifecycle management orchestrator, a request from a user to deploy the containerized application at the container runtime environment; in response to receiving the request, obtaining the collection of files and the descriptor information from a lifecycle management repository, wherein the collection of files is organized as a directory tree; and providing the obtained collection of files and the descriptor information to a container orchestration server running at the node cluster of the container runtime environment, wherein the container orchestration server registers the request from the user as the event associated with the containerized application that is detected.

In some instances, the example method can further comprise parsing, at the lifecycle management orchestrator, the collection of files to determine the solution image associated with the containerized application at a central repository; and replicating the solution image from the central repository to an image replication service, wherein the image replication service is running on the node cluster of the container runtime environment.

In some instances, the example method can further comprise executing, at the image replication service, a notary check on the solution image to verify authenticity of the solution image by invoking a notary service at the central repository.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

The present disclosure describes various tools and techniques for managing containerized applications.

In modern software deployments, containerization is implemented, which can be described as operating system (OS) virtualization. In containerization, applications (or microservices, software processes, etc.) are run in isolated user spaces referred to as containers. The containers use the same shared OS, and each provides a fully packaged and portable computing environment. That is, each container includes everything an application needs to execute (e.g., binaries, libraries, configuration files, dependencies, etc.). Because a container is abstracted away from the OS, containerized applications can execute on various types of infrastructure. For example, using containers, an application can execute in any of multiple cloud-computing environments.

In some instances, container orchestration can automate the deployment, management, scaling, and networking of containers. For example, container orchestration systems, in hand with underlying containers, enable applications to be executed across different environments (e.g., cloud computing environments) without needing to redesign the application for each environment. Enterprises that need to deploy and manage a significant number of containers (e.g., hundreds or thousands of containers) leverage container orchestration systems. An example container orchestration system is the Kubernetes platform, maintained by the Cloud Native Computing Foundation, which can be described as an open-source container orchestration system for automating computer application deployment, scaling, and management.

In some instances, customers of containerized application may need to process data on-premise because they cannot rely entirely on a cloud-based software. For example, customers in manufacturing plants, on oil rigs, and in many other operations often face the situation that their Internet connectivity is not reliable or has latency issues. In those cases, the operations of the customer need to proceed even if there are connectivity issues with cloud software. In those cases, part or a whole of a software solution can be executed on-premise as an alternative to the cloud environment that can be associated with connectivity drawbacks.

In some instances, an application can be executed in a hybrid environment where part of the application can run on the cloud and other parts can be on-premise. In some instances, cloud-based applications may need to consider computing scenarios where parts of a cloud solution (e.g., the application or the system) can be redeployed to run on network computing devices in an isolated customer's network (e.g., with no access from the Internet). In some instances, a customer may consider using customer network computing devices to run containerized application. The computing devices can include node clusters as a container runtime environment. In some instances, the network computing devices can support execution of containerized application at the container runtime environment, and/or the lifecycle of containerized applications can be managed through a lifecycle management orchestrator at a technology platform accessible to customers. The technology platform can provide services that support bringing data processing, analytics, integrations, and extensibility, among other capabilities, at a single place accessible to end customers.

In some instances, a software application can be offered to customers through the technology platform for deployment and management on a runtime environment. In some instances, the software application may be defined and developed to be executed in a particular environment, such as a containerized environment, and have a predefined target state at runtime. A containerized environment may provide a framework for orchestration of the software application for automating deployment, scaling, and operations of application containers associated with the system (or application) across clusters of hosts. In those instances, the software application can run in containers organized in clusters, where the clusters run on top of hardware host machines.

In some instances, customers manage and operate their software applications and systems that are hosted at different platform environments. For example, customers' applications can be hosted at an account area (or platform space) defined for the customer. The customers may use landscape management services provided at the technology platform to manage the landscape (or environment) where the customers' applications and systems run. Landscape management is associated with providing support to customers that have their software applications and systems running at various platform environments (e.g., interconnected or isolated, cloud environments, on-premise environments, or hybrid environments including cloud and on-premise environments).

Figure 1:
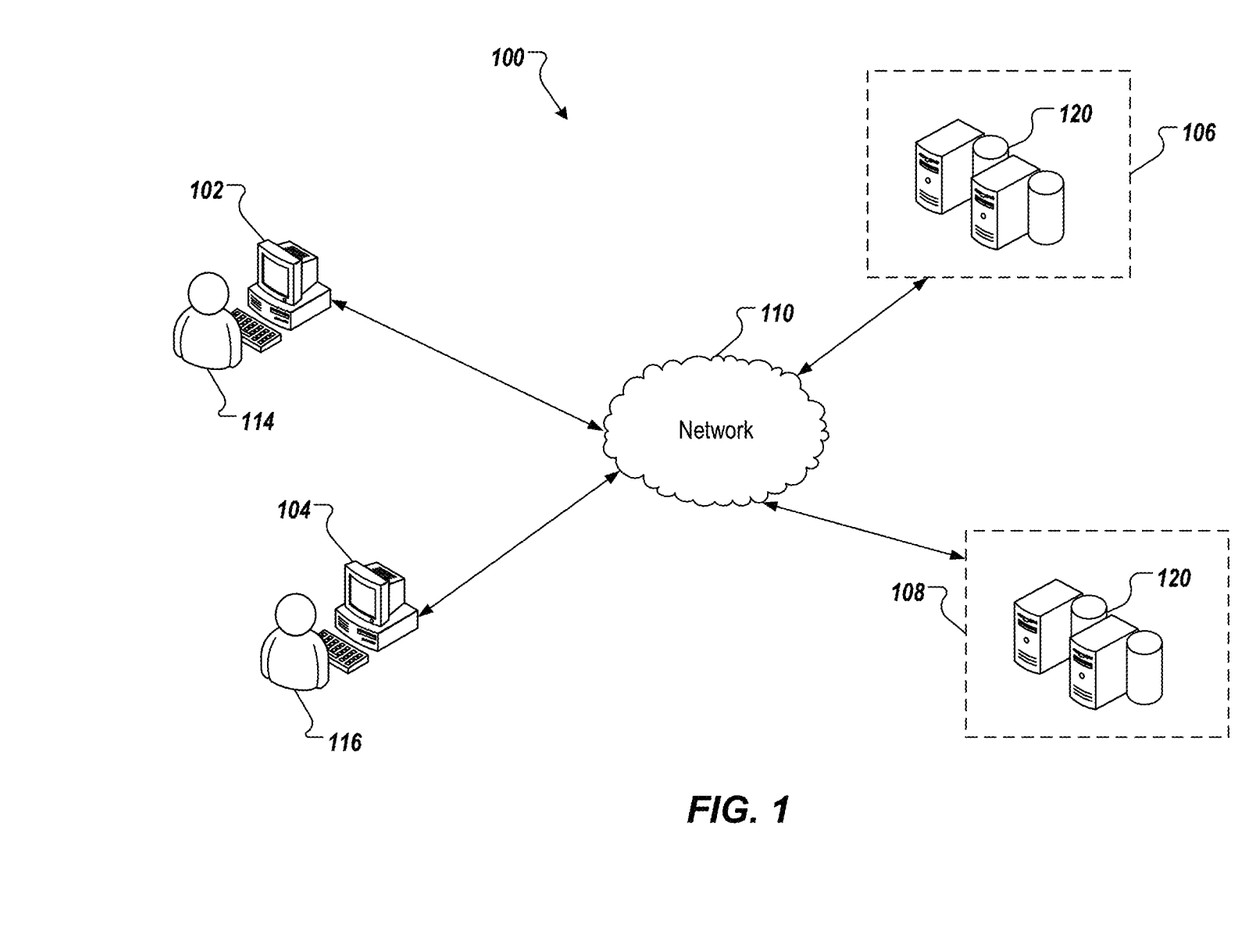
FIG. 1 depicts an example system that can execute implementations of the present disclosure.

FIG. 1 depicts an example architecture 100 in accordance with implementations of the present disclosure. In the depicted example, the example architecture 100 includes a client device 102, a client device 104, a network 110, and environments 106 and 108. In some instances, the environment 106 can be a cloud environment 106 and the environment 108 can be an on-premise environment in an isolated network. The cloud environment 106 may include one or more server devices and databases (e.g., processors, memory). In the depicted example, a user 114 interacts with the client device 102, and a user 116 interacts with the client device 104.

In some examples, the client device 102 and/or the client device 104 can communicate with the environment 106 and/or environment 108 over the network 110. The client device 102 can include any appropriate type of computing device, for example, a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 110 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the environment 106 include at least one server and at least one data store 120. In the example of FIG. 1, the environment 106 is intended to represent various forms of servers including, but not limited to, a web server, an application server, a proxy server, a network server, and/or a server pool. In general, server systems accept requests for application services and provides such services to any number of client devices (e.g., the client device 102 over the network 110).

In accordance with implementations of the present disclosure, and as noted above, the environment 106 and environment 106 can host applications and databases running on host infrastructure. In some instances, the environments 106 and 108 can include multiple cluster nodes that can represent physical or virtual machines. A hosted application and/or service can run on VMs hosted on cloud infrastructure or on on-premise infrastructure. In some instances, one application can run on at multiple environments that can be a hybrid combination of cloud and on-premise environments.

Figure 2:
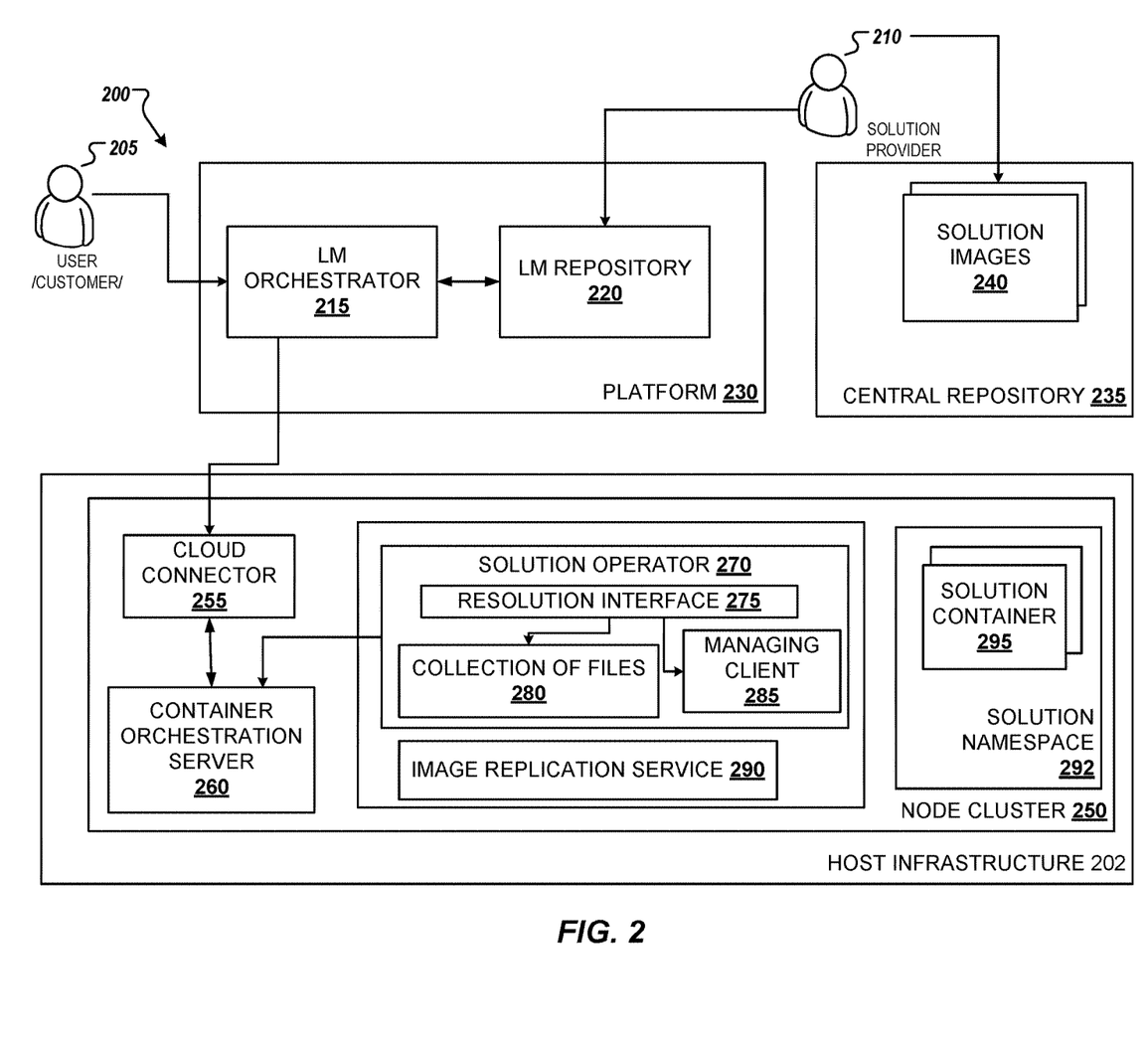
FIG. 2 is a system diagram of an example system including a lifecycle management orchestrator for managing execution of containerized applications in a cloud environment in accordance with implementations of the present disclosure.

FIG. 2 is a system diagram of an example system 200 including a lifecycle management orchestrator for managing execution of containerized applications in a cloud environment in accordance with implementations of the present disclosure.

In some instances, the landscape environment 200 includes a platform 230 that is a technology platform that can provide tools and resources to support execution of software applications. The platform 230 can include a lifecycle management orchestrator 215 configured to support lifecycle management of software applications running as containerized applications. In some instances, the containerized application can run at different runtime environment, including at hybrid environments or isolated network spaces, among others.

In those instances, the lifecycle management orchestrator 215 can run on the platform 230 and support organization and synchronization of lifecycle operations associated with provided containerized applications. In some instances, the platform 230 can be configured to support data management, analytics, integration, and extensibility capabilities for cloud and hybrid environments (including cloud and on-premise parts).

In some instances, the platform 230 can provide services to run and manage the software solutions in the cloud and/or on-premise. The different software solutions can be containerized applications that are configured to run as containers at a container runtime environment (e.g., Docker, Kubernetes). In some instances, the containerized applications can be enterprise-ready containerized solutions with prebuilt deployment templates (e.g., such as solution images, container images, Docker images, among other examples). In some instances, the containerized applications can be Kubernetes applications that can be run in the cloud, on-premise, or on clusters hosted in an infrastructure environments, among others.

In some instances, a solution provider 210 can be a user (e.g., a developer or administrator) or an application associated with a provider of software application. The solution provider 210 can be an entity associated with a provider of software application that can publish the solution images 240 at a central repository 235. The central repository 235 can be a central container registry where all solution images 240 associated with the platform 230 (and, in some instances, with multiple corresponding customers) are stored.

In some instances, solution image(s) 240 can be initially created to include binary files and other dependencies (e.g., libraries or other resources) necessary for executing the binary files at the host infrastructure 202. The solution image(s) 240 can be published, as provided by the solution provider 210, at the central repository 240.

In some instances, a collection of files that describe the resources, including the solution images, of a containerized application and descriptor information including dependency information associated with the resources can be provided for the containerized application to the platform 230. For example, the collection of files can be Kubernetes manifest files that can describe a desired state of deployed artifacts at the host infrastructure 250. The collection of files and the descriptor information can be provided to a lifecycle management repository 220 at the platform 230. In some instances, the collection of files and the descriptor information associated with the containerized application can be simultaneously or sequentially provided with the publishing of the corresponding solution image associated with the containerized application.

In some instances, the collection of files and the descriptor information can define how to model the containerized application as a deployed image. In some instances, the collection of files can be defined in a packaging format, such as a Helm Charts format. A Helm chart is a format defining a collection of files that describe a related set of resources of a containerized application. One Helm chart can be used to deploy a simple or a complex solution, including a full web application stack with servers, databases, caches, and other components. In some instances, the collection of files can be stored in a form of a directory tree. The collection of files can be included into a package with a respective solution image from the solution images 240 for deployment at a node cluster 250 of the host infrastructure 202.

In some instances, the platform 230 is communicatively coupled to a host infrastructure 202 for running the containerized applications at a container runtime environment on computing machines running at an isolated network associated with a given customer. In some instances, the platform 230 can determine multiple solution images 240 that can be used for deployment by different customers at the host infrastructure 202 or at other host infrastructures. In some instances, one host infrastructure can be associated with a single customer and dedicated to running applications of that customer (or a customer account). In some other instances, one host infrastructure can be associated with a group of accounts that may or may not correspond to a single customer.

In some instances, a user 205 (e.g., an end user of a customer of a provider of containerized application) can interact with the lifecycle management orchestrator 215 to request to deploy a containerized application from a list of applications provided by the provider of software application (e.g., solution provider 210). In some implementations, the lifecycle management orchestrator 215 can provide a list of applications that can be based on created solution images 240 at the central repository 235 associated with the platform 230. In some instances, the lifecycle management orchestrator 215 can be configured to receive and process lifecycle management requests, including a request to deploy a new containerized application, update a running containerized application, or delete a running containerized application.

In some more instances, instead of a request to deploy, a request to update the containerized application can be received from the user 205, where the containerized application can be an already running container at the host infrastructure 202. In some other instances, the request can be for another lifecycle operation associated with different stages of the lifecycle of an application defined at the platform 230 for applications running at the host infrastructure 202 and/or for a particular customer. The lifecycle operations can include an operation to start, update, upgrade, modify, redeploy, or delete, among other example operations. Those operations can be associated with one or more solution images relevant for executing the lifecycle operation for the containerized application. For example, for an application to be updated, a new or a modified solution image can be provided at the centralized repository, where the new update can be invoked by the lifecycle management orchestrator 215 based on the collection of files for the containerized application and used for executing an update operation.

In some instances, in response to receiving the request to deploy a particular containerized application, the lifecycle management orchestrator 215 executes a call through the cloud connector 255 to the container orchestration (API) server 260. The container orchestration server 260 can register an event that a containerized application (or a custom resource) is to be created. The platform 230 can be communicatively coupled to the host infrastructure 202 through the cloud connector 255 to securely send instructions associated with execution of operations associated with containerized applications to the node cluster 250 on the host infrastructure 202.

In some instances, a solution operator 270 can be provided at the node cluster 250. The solution operator 270 can be registered to receive notifications from the container orchestrator server 260 for newly published events. In some other instances, the solution operator 270 can actively listen for new events broadcasted from the container orchestration server 260. In response to detecting an event associated with creating a custom resource and deploying a solution image(s) for a containerized application, the solution operator 270 can process the event at a resolution interface 275. In some instances, the lifecycle management orchestrator 215 can read and parse the collection of files and determine relevant solution image(s) from the solution images 240 associated with the containerized application. The lifecycle management orchestrator 215 can provide the solution images related to the requested containerized application to an image replication service 290 and to the solution operator 270. In some instances, the image replication service 290 can execute a notary check of the solution images by verifying the authentication of the solution images based on a notary service executed at the central repository 235. In some instances, in response to receiving the solution images at the image replication service 290, the notary check can be configured to be executed automatically.

In some instances, the solution images can be persisted by the image replication service 290 (e.g., at a local container registry) and can be used for further executions of deploy operations, or can be kept in cache memory and deleted after a threshold time period. In response to the detected event at the container orchestrator server, the solution operator 270 receives the collection of files 280 from the lifecycle management orchestrator 215. Based on the received collection of files 280, the resolution interface 275 can trigger a managing client 285 (e.g., Helm client) to execute the collections of files 280 associated with the requested deploy operation. In the present instance, the resolution interface 275 requests to execute the collection of files 280 by using the managing client 285 to perform a deploy operation for the solution image(s) related to the containerized application based on the collection of files 280 and the descriptor information for the containerized application. The collection of files 280 and the descriptor information include information for modelling the containerized application and refers to the solution image(s) that are replicated at by the image replication service 290 and are associated with the requested containerized application for deployment. In some instances, the replication of the solution images support smooth execution of the deploy operation that can be performed more efficiently, faster, and without interruption in case of connectivity issues between the node cluster 250 and the central repository 235 where the solution images are originally stored.

In some instances, the solution operator 270 can be configured to perform regular checks to determine whether the deploy operation executed by the managing client 285 is completed, and to provide an update once the deploy operation is completed. Once the deploy operation is completed, the containerized application is running as a solution container 295 at the solution namespace 292 of the node cluster 250.

In some instances, the lifecycle management orchestrator 215 can perform regular checks for the status of the requested deploy by the user 205. The lifecycle management orchestrator 215 can check the status by performing calls to the solution operator 270 through the cloud connector 255. Once the lifecycle management orchestrator 215 receives the status for the performed deployment, the lifecycle management orchestrator 215 can provide the status to the user 205 (e.g., at a user interface of the lifecycle management orchestrator 215).

Figure 3:
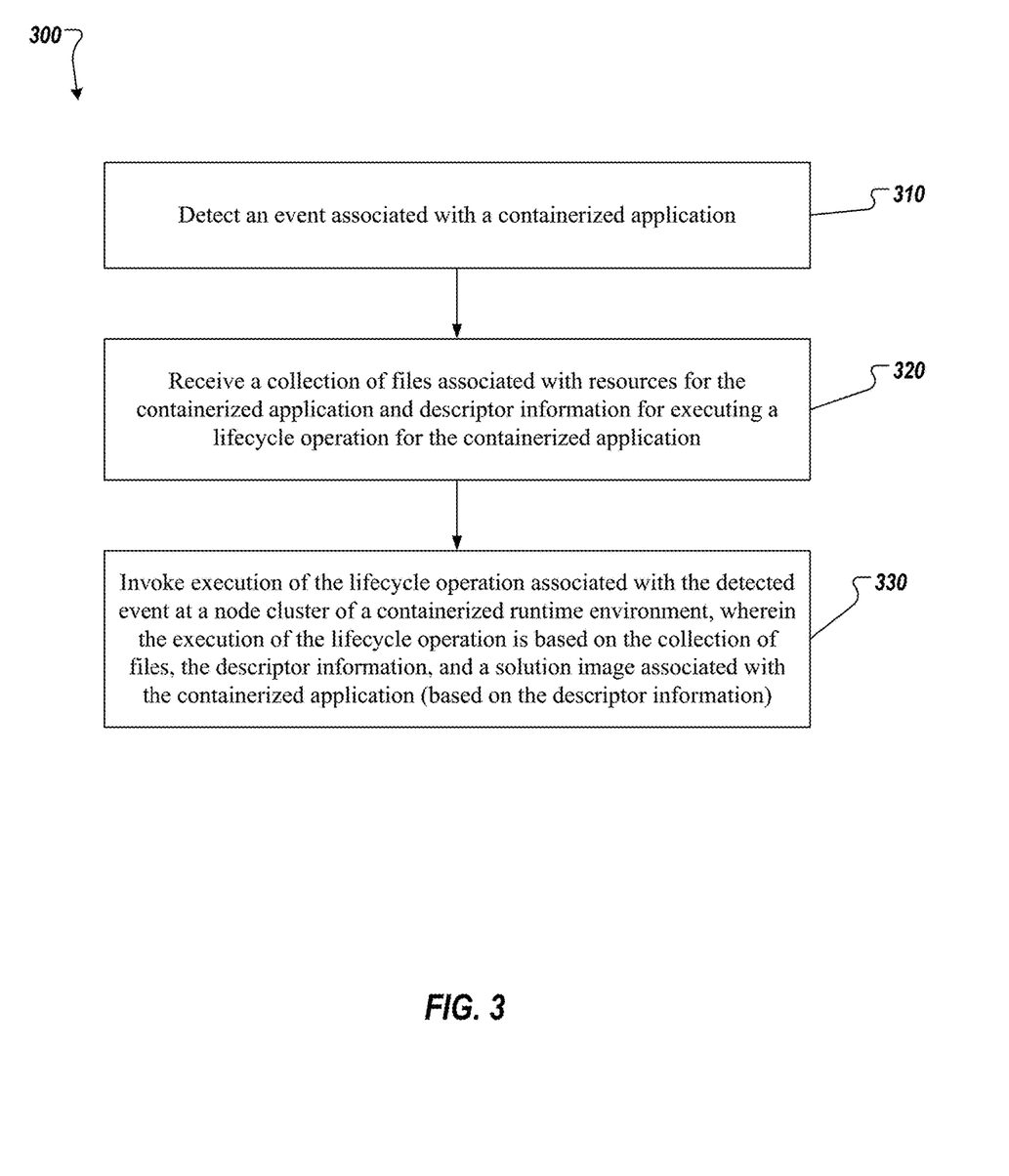
FIG. 3 is a block diagram for an example method for managing containerized applications in accordance with implementations of the present disclosure.

FIG. 3 is a block diagram for an example method 300 for management of containerized applications in accordance with implementations of the present disclosure. The example method 300 can be implemented, in some examples, at the landscape environment 200, and can be performed by the solution operator 270 of FIG. 2. The example method 300 can be implemented at a solution operator running at a node cluster that provides tools for secure management of lifecycle operations at a managed node cluster part of an isolated customer network environment. The node cluster can be associated with a technology platform that provides lifecycle management services for creating, deploying, managing, updating, modifying, and deleting, among other example lifecycle management operations.

In some instances, a user may request, through a lifecycle management orchestrator at the technology platform, to execute an operation to manage a containerized application. To be able to run a containerized application at a host infrastructure, a solution image can be initially created including binary files and other dependencies (e.g., libraries, or other resources) that are required to be able to run the containerized application at a container runtime environment (e.g., Docker). The solution image may be published at a central repository associated with the technology platform and the container runtime environment. Further, a collection of files that describe the resources of the containerized application and descriptor information including dependency information associated with the resources can be provided for the containerized application (e.g., from an end user associated with a solution provider that provides the containerized application). The collection of files and the descriptor information can define how to model the containerized application as a deployed image.

For example, a user (e.g., an end user of a customer of a provider of containerized application) can interact with the lifecycle management orchestrator to request to deploy a containerized application from a list of applications provided by an application provider. In some implementations, the lifecycle management orchestrator can provide a list of applications, as previously discussed, that can be based on created solution images at a central repository associated with the technology platform. The technology platform can be communicatively coupled to the host infrastructure to securely send instructions associated with execution of operations associated with containerized application to a node cluster on the host infrastructure.

In some instances, the lifecycle management orchestrator 215 can be a cloud application deployed as part of the technology platform that can support data management, analytics, integration, and extensibility capabilities for cloud and hybrid environments, and can include both cloud and on-premise parts. In some instances, the technology platform can be substantially similar to the platform 230 of FIG. 2.

In some implementations, when a request to execute an operation related to the containerized application is received at the lifecycle management orchestrator, the collection of file and the descriptor information can be read and parsed determine a relevant solution image and to extract the solution image from the central repository associated with the technology platform. That solution image, as well as the collection of file and the descriptor information can be provided to the container runtime environment to execute a relevant operation (e.g., deploy or delete) associated with the received request for the containerized application. A solution operator can be instantiated at a node cluster where the containerized application is or is about to be running. The solution operator can receive information about requests for executing operations related to containerized applications thought detecting events.

At 310, an event associated with the containerized application can be determined. The event can be detected at the solution operator running at the node cluster. In some instances, the solution operation can be similar to the solution operator 270. The solution operation can be listening to published events at a container orchestration server running at the node cluster. The container orchestrator server can be similar to the container orchestration server 260 of FIG. 2. In some implementations, the event can be published at the container orchestration server in response to a received request at the lifecycle management orchestrator.

The event may be associated with the received request for the containerized application at the lifecycle management orchestrator as previously discussed. The received request can be associated with the execution of a lifecycle operation for the containerized application. The lifecycle operations can include deployment, installation, update, upgrade, and/or delete, among other operations, of a containerized application that is to be executed or is already executing on the node cluster of the container runtime environment running on the host infrastructure.

At 320, in response to detecting the event, a collection of files associated with resources for the containerized application and descriptor information for executing of a lifecycle operation for the containerized application are received.

At 330, the lifecycle operation associated with the detected event is invoked for execution at a node cluster of a container runtime environment. The execution of the operation is based on the collection of files, the descriptor information, and a solution (application) image associated with the containerized application. A managing client running at the solution operator can execute the collection of files and determine the solution image based on the descriptor information.

In some instances, the lifecycle management orchestrator can provide the solution image from the central repository, where the solution image was stored by the solution provider, to an image replication service at the node cluster (e.g., the Image replication service 290 of FIG. 2), where the image replication service is used to store (or replicate) the solution image to a local registry at the node cluster. The image replication service can execute a notary check for the solution image to verify authenticity of the solution image by invoking a notary service at the central repository.

In some implementations, the status of the executed operation can be monitored and a status notification can be provided. In some instances, the status notification can be provided by the solution operator when the operation is completed. The status can be continuously monitored (e.g., at regular intervals) and an update of the status can be provided at a user interface to provide the status to an end user (e.g., a user associated with the request of the lifecycle operation).

Figure 4:
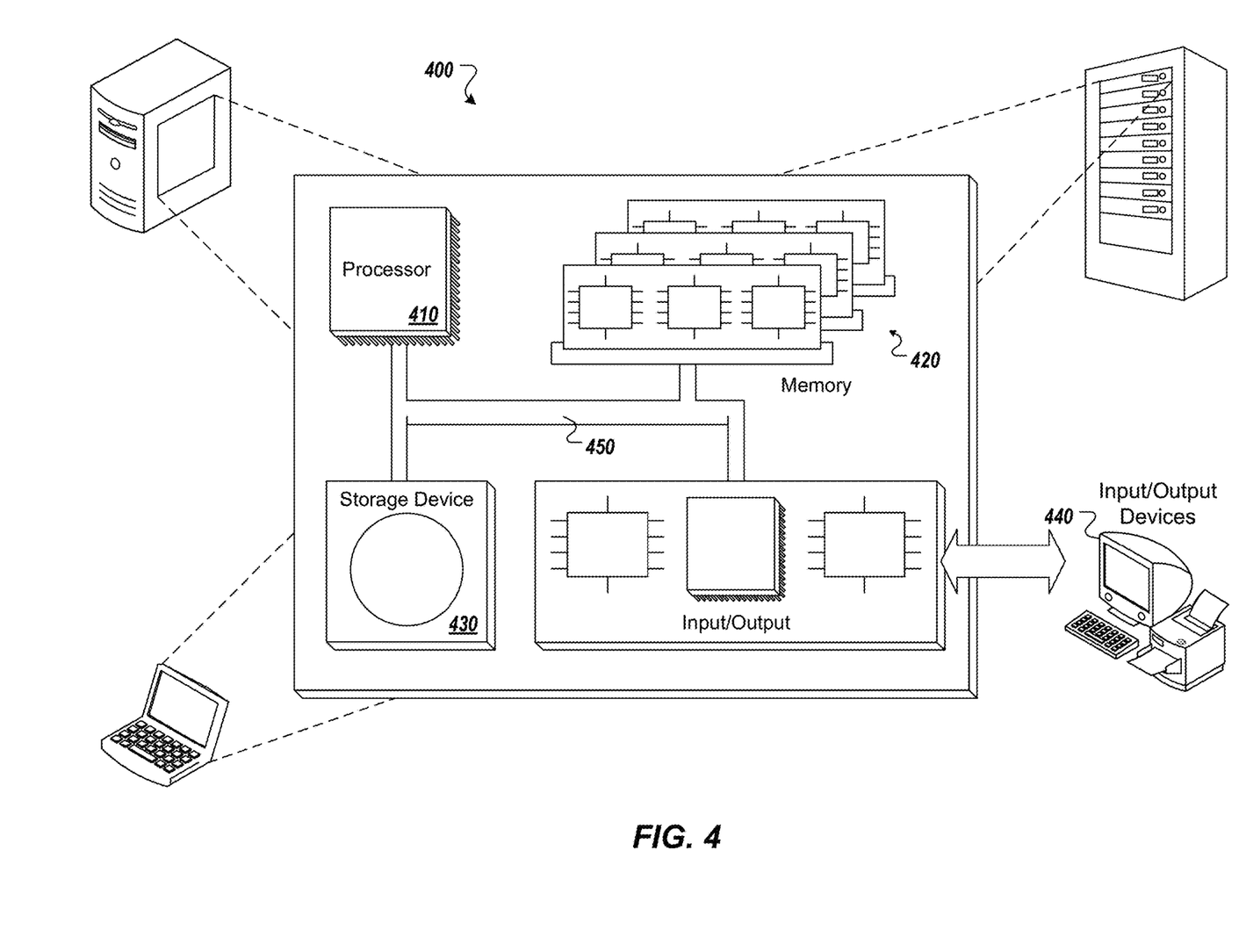
FIG. 4 is a schematic illustration of example computer systems that can be used to execute implementations of the present disclosure.

Referring now to FIG. 4, a schematic diagram of an example computing system 400 is provided. The system 400 can be used for the operations described in association with the implementations described herein. For example, the system 400 may be included in any or all of the server components discussed herein. The system 400 includes a processor 410, a memory 420, a storage device 430, and an input/output device 440. The components 410, 420, 430, and 440 are interconnected using a system bus 450. The processor 410 is capable of processing instructions for execution within the system 400. In some implementations, the processor 410 is a single-threaded processor. In some implementations, the processor 410 is a multi-threaded processor. The processor 410 is capable of processing instructions stored in the memory 420 or on the storage device 430 to display graphical information for a user interface on the input/output device 440.

The memory 420 stores information within the system 400. In some implementations, the memory 420 is a computer-readable medium. In some implementations, the memory 420 is a volatile memory unit. In some implementations, the memory 420 is a non-volatile memory unit. The storage device 430 is capable of providing mass storage for the system 400. In some implementations, the storage device 430 is a computer-readable medium. In some implementations, the storage device 430 may be a floppy disk device, a hard disk device, an optical disk device, or a tape device. The input/output device 440 provides input/output operations for the system 400. In some implementations, the input/output device 440 includes a keyboard and/or pointing device. In some implementations, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method operations can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a cathode ray tube (CRT) or liquid crystal display (LCD) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other operations may be provided, or operations may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

In view of the above described implementations of subject matter this application discloses the following list of examples, wherein one feature of an example in isolation or more than one feature of said example taken in combination and, optionally, in combination with one or more features of one or more further examples are further examples also falling within the disclosure of this application.

Example 1. A computer-implemented method for managing containerized applications, wherein the method comprises:
  detecting an event associated with a containerized application;
  in response to detecting the event, receiving a collection of files associated with resources for the containerized application and descriptor information for executing a lifecycle operation for the containerized application; and
  invoking execution of the lifecycle operation associated with the detected event at a node cluster of a container runtime environment, wherein the execution of the lifecycle operation is based on the collection of files, the descriptor information, and a solution image associated with the containerized application, wherein the solution image is determined based on the descriptor information.

Example 2. The method of Example 1, further comprising:
  providing a status notification for the execution of the lifecycle operation.

Example 3. The method of Example 1 or Example 2, wherein the detected event is associated with a lifecycle operation, wherein the event is selected from a group comprising an installation event, an update event, and a delete event.

Example 4. The method of any one of the preceding Examples, further comprising:
  registering a solution operator to receive notification from a containerized orchestration server running at the node cluster of the container runtime environment,
  wherein the solution operator is configured to listen to events registered at the containerized orchestration server to detect the event associated with the containerized application.

Example 5. The method of any one of the preceding Examples, wherein the detection of the event is performed by a solution operator running at the node cluster of the containerized runtime environment.

Example 6. The method of any one of the preceding Examples, further comprising:
  receiving, at lifecycle management orchestrator at a cloud platform, a request to manage the containerized application, wherein the receiving of the request comprises:
    receiving, at a lifecycle manager repository associated with the cloud platform, the collection of files and the descriptor information; and
    receiving, at a central repository associated with the cloud platform, a solution image as an executable file for running the containerized application in a container at the cluster node at the container runtime environment.

Example 7. The method of any one of the preceding Examples, further comprising:

receiving, at a lifecycle management orchestrator, a request from a user to deploy the containerized application at the container runtime environment;

in response to receiving the request, obtaining the collection of files and the descriptor information from a lifecycle management repository, wherein the collection of files is organized as a directory tree; and providing the obtained collection of files and the descriptor information to a container orchestration server running at the node cluster of the container runtime environment, wherein the container orchestration server registers the request from the user as the event associated with the containerized application that is detected.

Example 8. The method of any one of the preceding Examples, further comprising:

parsing, at the lifecycle management orchestrator, the collection of files to determine the solution image associated with the containerized application at a central repository; and replicating the solution image from the central repository to an image replication service, wherein the image replication service is running on the node cluster of the container runtime environment.

Example 9. The method of any one of the preceding Examples, further comprising:

executing, at the image replication service, a notary check on the solution image to verify authenticity of the solution image by invoking a notary service at the central repository.

What is claimed is:

1. A computer-implemented method for managing containerized applications, wherein the method comprises:

receiving, at a lifecycle management orchestrator, a request from a user to perform a lifecycle operation to deploy a containerized application at a container runtime environment;

registering, by a container orchestration server, the request from the user as an event associated with the containerized application in response to receiving the request;

detecting the event associated with the containerized application;

in response to detecting the event, receiving a collection of files associated with resources for the containerized application and descriptor information for managing the containerized application from a lifecycle management repository, wherein the collection of files is organized as a directory tree;

providing the collection of files and the descriptor information to a container orchestration server running at a node cluster of the container runtime environment;

parsing, at a lifecycle management orchestrator, the collection of files to determine a solution image associated with the containerized application;

receiving, at a central repository, the solution image as an executable file for running the containerized application in a container at a node cluster at the container runtime environment;

replicating the solution image from the central repository to an image replication service, wherein the image replication service is running on the node cluster of the container runtime environment; and executing, at the image replication service, a notary check on the solution image to verify authenticity of the solution image by invoking a notary service at the central repository.

2. The method of claim 1, further comprising:
providing a status notification for execution of the lifecycle operation.

3. The method of claim 1, wherein the detected event is associated with the lifecycle operation, wherein the event is one of an installation event, an update event, or a delete event.

4. The method of claim 1, further comprising:
registering a solution operator to receive notification from the container orchestration server running at the node cluster of the container runtime environment,
wherein the solution operator is configured to listen to events registered at the container orchestration server to detect the event associated with the containerized application.

5. The method of claim 1, wherein the detection of the event is performed by a solution operator running at the node cluster of the container runtime environment.

6. The method of claim 1, further comprising:
receiving, at a lifecycle management orchestrator at a cloud platform, the request to manage the containerized application, wherein the receiving of the request comprises:
receiving, at a lifecycle manager repository associated with the cloud platform, the collection of files and the descriptor information.

7. A non-transitory, computer-readable medium coupled to one or more processors and having instructions stored thereon which, when executed by the one or more processors, cause the one or more processors to perform operations, the operations comprising:

receiving, at a lifecycle management orchestrator, a request from a user to perform a lifecycle operation to deploy a containerized application at a container runtime environment;

registering, by a container orchestration server, the request from the user as an event associated with the containerized application in response to receiving the request;

detecting the event associated with the containerized application;

in response to detecting the event, receiving a collection of files associated with resources for the containerized application and descriptor information for managing the containerized application from a lifecycle management repository, wherein the collection of files is organized as a directory tree;

providing the collection of files and the descriptor information to a container orchestration server running at a node cluster of the container runtime environment;

parsing, at a lifecycle management orchestrator, the collection of files to determine a solution image associated with the containerized application;

receiving, at a central repository, the solution image as an executable file for running the containerized application in a container at a node cluster at the container runtime environment;

replicating the solution image from the central repository to an image replication service, wherein the image replication service is running on the node cluster of the container runtime environment; and executing, at the image replication service, a notary check on the solution image to verify authenticity of the solution image by invoking a notary service at the central repository.

8. The computer-readable medium of claim 7, further comprising instructions which, when executed by the one or more processors, cause the one or more processors to perform operations, the operations comprising:

provid­ing a status notification for execution of the lifecycle operation.

9. The computer-readable medium of claim 7, wherein the detected event is associated with the lifecycle operation, wherein the event is one of an installation event, an update event, or a delete event.

10. The computer-readable medium of claim 7, further comprising instructions which, when executed by the one or more processors, cause the one or more processors to perform operations, the operations comprising:

registering a solution operator to receive notification from the container orchestration server running at the node cluster of the container runtime environment, wherein the solution operator is configured to listen to events registered at the container orchestration server to detect the event associated with the containerized application.

11. The computer-readable medium of claim 7, further comprising instructions which, when executed by the one or more processors, cause the one or more processors to perform operations, the operations comprising:

receiving, at a lifecycle management orchestrator at a cloud platform, the request to manage the containerized application, wherein the receiving of the request comprises:

receiving, at a lifecycle manager repository associated with the cloud platform, the collection of files and the descriptor information.

12. A system comprising:

a computing device; and a computer-readable storage device coupled to the computing device and having instructions stored thereon which, when executed by the computing device, cause the computing device to perform operations, the operations comprising:

receiving, at a lifecycle management orchestrator, a request from a user to perform a lifecycle operation to deploy a containerized application at a container runtime environment;

registering, by a container orchestration server, the request from the user as an event associated with the containerized application in response to receiving the request;

detecting the event associated with the containerized application;

in response to detecting the event, receiving a collection of files associated with resources for the containerized application and descriptor information for managing the containerized application from a lifecycle management repository, wherein the collection of files is organized as a directory tree;

providing the collection of files and the descriptor information to a container orchestration server running at a node cluster of the container runtime environment;

parsing, at a lifecycle management orchestrator, the collection of files to determine a solution image associated with the containerized application;

receiving, at a central repository, the solution image as an executable file for running the containerized application in a container at a node cluster at the container runtime environment;

replicating the solution image from the central repository to an image replication service, wherein the image replication service is running on the node cluster of the container runtime environment; and executing, at the image replication service, a notary check on the solution image to verify authenticity of the solution image by invoking a notary service at the central repository.

13. The system of claim 12, wherein the computer-readable storage device further comprises instructions which, when executed by the computing device, cause the computing device to perform operations, the operations comprising:

providing a status notification for execution of the lifecycle operation.

14. The system of claim 12, wherein the detected event is associated with the lifecycle operation, wherein the event is one of an installation event, an update event, or a delete event.

15. The system of claim 12, wherein the computer-readable storage device further comprises instructions which, when executed by the computing device, cause the computing device to perform operations, the operations comprising:

registering a solution operator to receive notification from the container orchestration server running at the node cluster of the container runtime environment, wherein the solution operator is configured to listen to events registered at the container orchestration server to detect the event associated with the containerized application.

* * * * *